United States Patent
Ji et al.

(10) Patent No.: US 11,682,954 B2
(45) Date of Patent: Jun. 20, 2023

(54) FAN MOTOR AND HOME APPLIANCE INCLUDING SAME

(71) Applicant: LG Electronics Inc., Seoul (KR)

(72) Inventors: Young Jin Ji, Seoul (KR); Seongguk Kim, Seoul (KR); Hosuk Kim, Seoul (KR); Gyeong Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 17/183,891

(22) Filed: Feb. 24, 2021

(65) Prior Publication Data

US 2021/0288566 A1    Sep. 16, 2021

(30) Foreign Application Priority Data

Mar. 10, 2020 (KR) ........................ 10-2020-0029478

(51) Int. Cl.
| | | |
|---|---|---|
| *H02K 19/10* | (2006.01) | |
| *H02K 3/28* | (2006.01) | |
| *H02K 3/50* | (2006.01) | |
| *H02K 9/06* | (2006.01) | |

(52) U.S. Cl.
CPC ............ *H02K 19/10* (2013.01); *H02K 3/28* (2013.01); *H02K 3/50* (2013.01); *H02K 9/06* (2013.01)

(58) Field of Classification Search
CPC ............ H02K 19/10; H02K 3/28; H02K 3/50; H02K 9/06; H02K 15/095; H02K 1/14; H02K 1/146; H02K 3/12; H02K 5/225; H02K 11/33; H02K 3/18; H02K 3/345; H02K 3/521; H02K 5/161; H02K 29/00; H05K 7/20909
See application file for complete search history.

(56) References Cited

U.S. PATENT DOCUMENTS

| | | | |
|---|---|---|---|
| 2006/0152188 A1 | 7/2006 | Yasuhara et al. | |
| 2018/0219460 A1* | 8/2018 | Shiozawa | ............... H02K 11/33 |
| 2019/0319506 A1* | 10/2019 | Reu | ......................... H02K 3/522 |

FOREIGN PATENT DOCUMENTS

| | | |
|---|---|---|
| CN | 110291700 | 9/2019 |
| CN | 110391708 | 10/2019 |
| EP | 1670120 A1 | 1/2014 |
| EP | 2827475 A1 | 4/2016 |

(Continued)

OTHER PUBLICATIONS

JP2002199636A English translation (Year: 2022).*

(Continued)

*Primary Examiner* — Tulsidas C Patel
*Assistant Examiner* — Viswanathan Subramanian
(74) *Attorney, Agent, or Firm* — Fish & Richardson P.C.

(57) ABSTRACT

A motor includes a rotor assembly and a stator assembly that accommodates the rotor assembly. The stator assembly includes a stator core including tooth portions corresponding to first to third phase currents, respectively, and a coil wound around the tooth portions and defining a Y connection of the first to third phase currents, a neutral point terminal defining a neutral point of the Y connection, and power terminals configured to communicate each phase current with the Y connection. The coil includes a primary winding and a secondary winding that are wound around each of the tooth portions, that are electrically connected parallel to each other, and that are connected to each of the power terminals.

20 Claims, 14 Drawing Sheets

(56) References Cited

FOREIGN PATENT DOCUMENTS

| | | |
|---|---|---|
| EP | 3089331 A1 | 11/2016 |
| EP | 3355447 A1 | 8/2018 |
| JP | 2002-199636 | 7/2002 |
| JP | 2002199636 | 7/2002 |
| JP | 2002199636 A | 7/2002 |
| JP | 2019054671 A2 | 4/2019 |
| KR | 100253231 | 4/2000 |
| KR | 100845867 | 7/2008 |
| KR | 10-1241920 | 3/2013 |
| KR | 1020190007907 | 1/2019 |
| KR | 1020190008609 | 1/2019 |

OTHER PUBLICATIONS

KR Office Action in Korean Appln. No. 10-2020-0029478, dated May 12, 2021, 12 pages (with English translation).
Extended European Search Report in European Appln. No. 21155125.4, dated Jul. 19, 2021, 10 pages.
Office Action in Chinese Appln. No. 202110198890.1, dated Mar. 28, 2023, 17 pages (with English translation).
Search Report in Chinese Appln. No. 202110198890.1, dated Mar. 28, 2023, 2 pages.

* cited by examiner

FAN MOTOR AND HOME APPLIANCE INCLUDING SAME

CROSS REFERENCE TO RELATED APPLICATION

The present application claims priority to Korean Patent Application No. 10-2020-0029478, filed on Mar. 10, 2020, the entire contents of which are incorporated herein for all purposes by this reference.

TECHNICAL FIELD

The present disclosure relates to a motor and a home appliance and, more specifically, to a brushless motor in which an inverter is integrally provided and a home appliance including the same.

BACKGROUND

Motors are used for various purposes. For example, a fan motor can include a motor to provide rotational force and a fan that is integrally provided with the motor and rotated by the motor to generate airflow. The fan motor is widely used in home appliances using airflow. For instance, the fan motor can be used for a vacuum cleaner, an outdoor unit of an air conditioner, or an air purifier.

In some cases, a brushless direct current (BLDC) motor can be used as a motor of the fan motor. The BLDC motor may reduce or prevent friction and abrasion, which may occur in a direct current (DC) motor in some cases. The BLDC motor can have a relatively high efficiency. The BLDC motor is a motor in which brushes and commutators are eliminated from DC motors and electronic commutation mechanisms are provided.

In some cases, BLDC motors can include an inverter unit that is integrally embedded. When the inverter unit is integrally provided in the motor, the structure may be simplified, but the overall size of the motor can increase. For example, electronic components such as a cylindrical capacitor provided in the inverter unit can increase the overall height of the motor, thereby limiting downsizing of the motor.

In some cases, to increase the performance of the motor without increasing the size of the motor, the current capacity may be increased. In some cases, the diameter of the coil wound around the stator can be made thicker. In some cases, when the coil is made thicker, winding of the coil can become difficult, and the connector or harness may be enlarged according to the coil.

In some cases, the number of slots around which the coils are wound may be increased. As the number of slots is increased, the size of the stator increases and the structure thereof can become complicated. Alternatively, coils of each phase can be connected in parallel by double-winding the coil. In some cases, two lead wires (coils) can be connected to each phase of the power supply unit in order to double-wind the coil. In these cases, the winding operation may be difficult.

In some cases of a three-phase multi-pole motor, a total of six coils may be connected at the neutral point. In the some cases of such a parallel connection, there are relatively many parts to be connected, and the probability of incorrect connection may be high and thus product reliability may be degraded.

In some cases, where at least six coils are connected at the neutral point, the size of the neutral point terminal can increase. Accordingly, it may be difficult to design the neutral terminal and other components, for example, components of an inverter so as not to interfere with each other. In some cases, a total of three hooks may be provided in the terminal constituting the neutral point and thus the left and right width of the terminal is very wide. In some cases, where three slots are provided at the terminal constituting the neutral point, the size of the terminal may be also increased.

In some cases, a plurality of components may be provided in the inverter unit that is integrally provided in the motor. High heat may be generated from the electronic components provided in the inverter unit. In some examples, a heat dissipation structure may remove the heat generated from a metal oxide silicon field effect transistor (MOSFET) device or a capacitor provided in a printed circuit board (PCB) of the inverter unit.

In some examples, a fan may be separately provided to cool the inverter, which can result in an increase of the cost. The structure can become complicated depending on the configuration of the cooling fan. In some cases, the inventor can include a capacitor provided on the side of the PCB and a plurality of radiating fins. In some cases, the structure can become complicated with the capacitor that protrudes to the side of the PCB to increase the total area of the fan motor and to provide the heat dissipation fin.

SUMMARY

The present disclosure describes a fan motor that can reduce the size of the neutral point terminal forming the neutral point when the coil is wound in double in a three-phase Y connection method.

The present disclosure also describes a fan motor that can reduce the size of the neutral point terminal so that the heat generating element of the motor inverter unit and the neutral point terminal do not interfere with each other.

The present disclosure further describes a fan motor that can facilitate cooling of a heat generating element (MOSFET element, capacitor, etc.) provided in the inverter unit of the motor by the impeller of the motor.

According to one aspect of the subject matter described in this application, a motor includes a rotor assembly configured to rotate about a rotation shaft, and a stator assembly that accommodates the rotor assembly. The stator assembly includes a stator core including a plurality of tooth portions that correspond to a first phase current, a second phase current, and a third phase current, respectively. The stator assembly further includes a coil that is wound around the plurality of tooth portions, the coil defining a three-phase Y connection of the first phase current, the second phase current, and the third phase current, a neutral point terminal that defines a neutral point of the three-phase Y connection, and a plurality of power terminals configured to communicate the first phase current, the second phase current, and the third phase current with the three-phase Y connection. The coil includes a primary winding and a secondary winding that are wound around each of the plurality of tooth portions, that are electrically connected parallel to each other, and that are connected to each of the plurality of power terminals.

Implementations according to this aspect can include one or more of the following features. For example, the coil can include a start end and a terminating end that are connected to each other at the neutral point terminal. In some examples, the primary winding of one tooth portion among the plurality of tooth portions can extend to the neutral point terminal, and then connects to the secondary winding of the one tooth portion. The secondary winding of the one tooth portion can connect to the primary winding of another tooth portion among the plurality of tooth portions.

In some implementations, the neutral point terminal can define a plurality of neutral point receiving grooves that accommodate the start end, the terminating end, and a plurality of via ends of the coil. For example, the plurality of via ends are portions of the coil that connect one of the plurality of tooth portions to another of the plurality of tooth portions.

In some implementations, the plurality of neutral point receiving grooves can be two neutral point receiving grooves, where each of the two neutral point receiving grooves receives two among the start end, the terminating end, and the plurality of via ends of the coil.

In some implementations, the stator assembly can further include an insulator coupled to a top of the stator core, and the insulator can include a storage portion that accommodates at least one of the plurality of power terminals or the neutral point terminal. For example, the storage portion can include a first storage portion that accommodates at least a part of the neutral point terminal and defines a plurality of coil insertion grooves, and a second storage portion that accommodates at least a part of the plurality of power terminals.

In some implementations, the neutral point terminal can define a plurality of neutral point receiving grooves that accommodate the coil, where the plurality of coil insertion grooves are connected to the plurality of neutral point receiving grooves. In some examples, the plurality of coil insertion grooves are two coil insertion grooves defined in the first storage portion.

In some implementations, the plurality of tooth portions can include a first tooth portion corresponding to the first phase current, a second tooth portion corresponding to the second phase current, and a third tooth portion corresponding to the third phase. The plurality of power terminals can include a first power terminal configured to communicate the first phase current, a second power terminal configured to communicate the second phase current, and a third power terminal configured to communicate the third phase current.

In some examples, the primary winding and the secondary winding can include a first phase primary winding and a first phase secondary winding that are wound around the first tooth portion and connected to the first power terminal, a second phase primary winding and a second phase secondary winding that are wound around the second tooth portion and connected to the second power terminal, and a third phase primary winding and a third phase secondary winding that are wound around the third tooth portion and connected to the third power terminal.

In some examples, the neutral point terminal can define a neutral point receiving groove. The coil can extend from a start end of the coil in the neutral point receiving groove to the first phase primary winding, pass the first power terminal, and then continue to the first phase secondary winding, where the first phase secondary winding has a first phase via end that passes through the neutral point receiving groove and that is connected to the second phase primary winding. The coil can then extend from the first phase via end in the neutral point receiving groove to the second phase primary winding, pass the second power terminal, and then continue to the second phase secondary winding, where the second phase secondary winding has a second phase via end that passes through the neutral point receiving groove and that is connected to the third phase primary winding. The coil can then extend from the second phase via end in the neutral point receiving groove to the third phase primary winding, pass the third power terminal, and then continue to the third phase secondary winding, where the third phase secondary winding has a terminating end of the coil that passes through the neutral point receiving groove.

In some implementations, the neutral point terminal can include a first plate, and a second plate that is bent from the first plate and extends to face the first plate, where the first plate and the second plate define the plurality of neutral point receiving grooves that are connected to each other. In some examples, the plurality of via ends are portions of the coil that connect one of the plurality of tooth portions to another of the plurality of tooth portions, and the plurality of neutral point receiving grooves include a first groove that accommodates the start end and the terminating end of the coil, and a second groove that accommodates the plurality of via ends of the coil.

In some examples, each of the first groove and the second groove can extend vertically from a bending portion disposed at bottom ends of the first plate and the second plate, and the start end of the coil can be disposed vertically above the terminating end of the coil in the first groove.

In some implementations, the motor can further include a housing frame that supports a first end of the rotation shaft, a housing cover that is connected to the housing frame and supports a second end of the rotation shaft, a diffuser disposed in the housing cover, an impeller that is disposed on the diffuser, that is connected to the rotation shaft, and that is configured to rotate together with the rotation shaft, and an inverter disposed on the housing frame and positioned at an opposite side of the impeller with respect to the housing cover. The inverter can include heat generating elements that face the impeller, where at least a part of the stator assembly can be accommodated between the housing frame and the housing cover. The neutral point terminal and the power terminal can protrude from the stator assembly toward the inverter and can be disposed between the heat generating elements of the inverter.

In some implementations, the housing frame can include a first bearing receiving portion disposed at a center of the housing frame, a plurality of connection bridges that extend radially from the first bearing receiving portion, and a leg body that extends from an end of each of the plurality of connection bridges toward the housing cover, where each leg body has a first end coupled to the housing cover and a second end coupled to the inverter. In some examples, the inverter can include a circuit board, where at least a part of the circuit board is disposed in a discharge path of air discharged by the impeller, and the heat generating elements of the inverter can be positioned closer to an outer edge of the circuit board than to a center of the circuit board. For example, the heat generating elements of the inverter can include transistors and capacitors.

According to another aspect, a home appliance includes the motor and one more of the features of the motor described above.

In some implementations, each coil constituting three phases of U, V, and W can be wound in double (primary winding and secondary winding). For example, two coils may be not wound at the same time, but wound in an overlapping manner so that the coil is primarily wound, passes by the power terminal, and then secondarily wound, where each phase can be connected in parallel. Therefore, since the coils are wound on a per-strand basis, there is an effect of facilitating the winding process while improving the performance of the motor.

In some implementations, when the coils of each phase are connected in parallel, the coils can be wound around each tooth portion on a per-strand basis, whereby the number of neutral point receiving grooves, by which the coil passes, in the neutral point terminal, can also be reduced. Therefore, the overall size of the neutral point terminal can be reduced, whereby the motor can be miniaturized, and interference with peripheral components such as the heat generating element of the inverter can be prevented more easily.

In some implementations, the neutral point terminal can be configured so that two plates (first plate and second plate) face each other, and each plate can be configured so that the neutral point receiving grooves are connected to each other. Therefore, when each coil passes by the neutral point terminal, the coil can be inserted into each neutral point receiving groove in the two plates. Therefore, the neutral point terminal and the coil can be electrically connected to each other at two points, thereby improving the operation reliability of the motor.

In some implementations, the inverter can be integrally coupled to the fan motor to simplify the overall structure of the motor system, and at the same time, the heat generating elements (such as MOSFET element or capacitor) in the inverter can be installed to face the impeller and thus cooled. That is, the heat generating elements can be cooled by the airflow generated by the impeller without a separate cooling device, whereby there is an effect of improving the performance and efficiency of the fan motor while miniaturizing the fan motor.

In some implementations, the coil can be wound in double in order to improve the performance of the motor. Herein, the coil is wound around the tooth portions on a per-strand basis in order to form each phase. Accordingly, the size of the neutral point terminal connecting the coil in three phases can be reduced, and interference between the heat generating element of the inverter and the neutral point terminal can be prevented, thereby increasing the design freedom of the fan motor.

In some implementations, terminals coupled to the stator assembly can be disposed between the heat generating elements of the inverter. Therefore, even when the heat generating elements and terminals are installed in the direction facing each other, interference between the heat generating elements and the terminals can be prevented, thereby effectively cooling the heat generating element.

In some implementations, the heat generating elements can be disposed close to the outer edge of the inverter, particularly on the discharge path of the air discharged to the outside of the fan motor through the impeller and the diffuser. Therefore, the heat generating elements can be cooled by the impeller and the diffuser, and deterioration of the fan motor due to heat generation can be prevented.

In some implementations, a plurality of support legs can be radially extended in the housing frame supporting the inverter, and an empty space can be located between the support legs. Herein, since the support leg can make it possible to secure the insulation distance by separating the inverter from the stator assembly, and air is discharged into the empty space between the support legs, the air can flow smoothly.

In some implementations, since heat generating elements can be arranged in the installation space formed between the support legs, air discharged from the impeller can be discharged into the empty space between the support legs through the heat generating element. Therefore, the heat generating element can be cooled more effectively.

In some implementations, the inverter unit can be spaced apart from the stator assembly by the height of the support leg of the housing frame. Therefore, the heat generating element protruding from the inverter unit toward the stator assembly can make it possible to secure the insulation distance sufficient from the coil of the stator assembly and radiate the heat as much as the spaced distance.

In some implementations, only the terminal can be arranged, and alternatively the heat generating element can be arranged, in some installation spaces of a plurality of installation spaces formed between the support legs of the housing frame supporting the inverter. Therefore, interference between the terminal and the heat generating element can be more reliably prevented, and the insulation distance between each component can be sufficiently secured.

DETAILED DESCRIPTION

Figure 1:
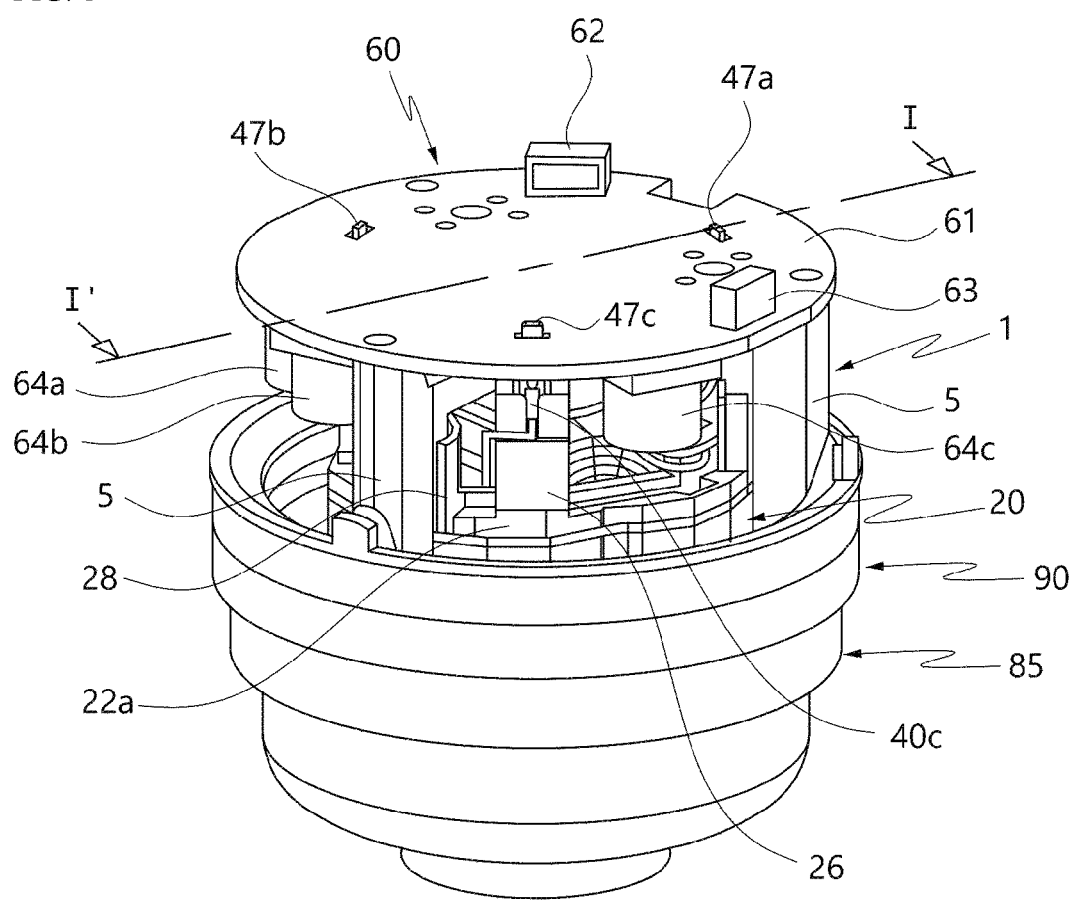
FIG. 1 is a perspective view showing an example of a fan motor.

Hereinafter, one or more implementations of the present disclosure will be described in detail with reference to the accompanying drawings. It should be noted that in adding reference numerals to the components of each drawing, the same components have the same reference numerals when possible, even if they are displayed on different drawings.

The present disclosure relates to a motor and a home appliance having the same. Herein, the home appliance can include various electronic products using a motor, such as a vacuum cleaner, an air purifier, a ventilator, or the like. Further, the motor according to the present disclosure can include a motor with an inverter such as a brushless direct current (BLDC) motor. Hereinafter, among motors, a fan motor will be described as an example, and the present disclosure will be described on the basis of the structure of the fan motor.

Figure 2:
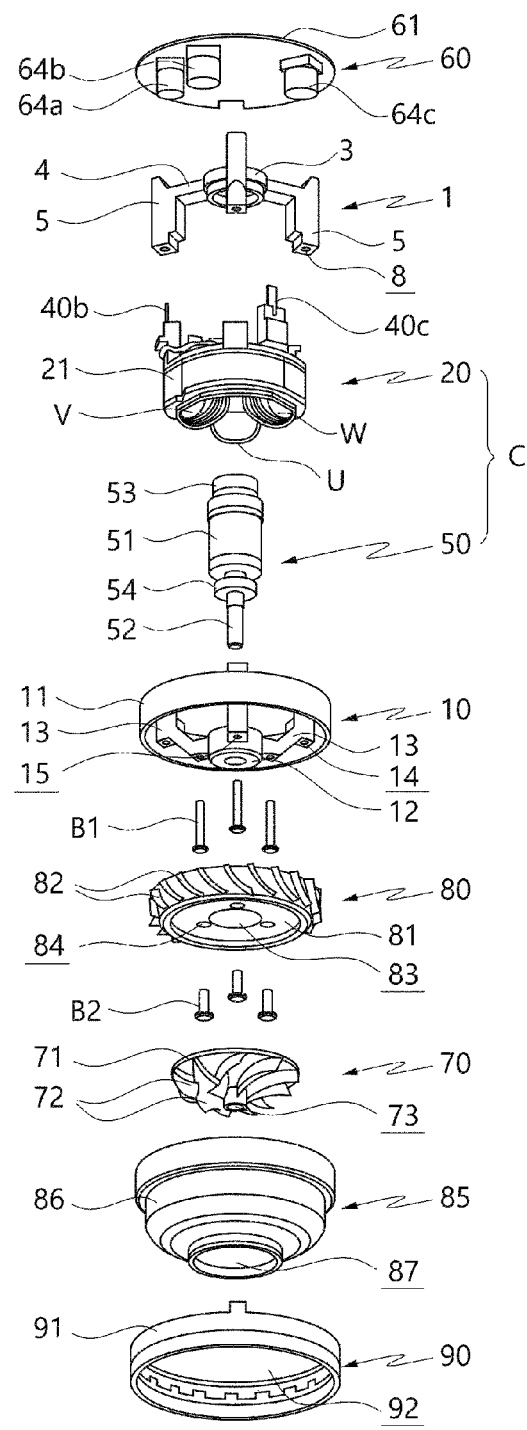
FIG. 2 is an exploded perspective view of example components of the fan motor shown in FIG. 1.

Referring to FIGS. 1 and 2, the fan motor can include a housing frame 1 and a housing cover 10. The housing frame 1 and the housing cover 10 can be assembled to each other to create a predetermined space therebetween, and a motor unit C, which will be described below, can be embedded in the space.

The housing frame 1 and the housing cover 10 can support both ends of a rotor assembly 50 constituting the motor unit C. For example, the housing frame 1 and the housing cover 10 support a first bearing 53 and a second bearing 54 of the rotor assembly 50, respectively. To this end, the housing frame 1 and the housing cover 10 can be assembled with each other in the longitudinal direction of the rotor assembly 50.

A first bearing receiving portion 3 can be located at the center of the housing frame 1, and a plurality of support legs 4 and 5 are radially provided around the first bearing receiving portion 3. The first bearing receiving portion 3 has a substantially circular structure and has an empty space in the center so that the first bearing 53 of the rotor assembly 50 is inserted therein. For reference, the first bearing 53 and the second bearing 54 of the rotor assembly 50 are arbitrarily set in order, and the order thereof can be reversed.

The support legs 4 and 5 can extend from the outer circumferential surface of the first bearing receiving portion 3. In some examples, the support legs 4 and 5 can be configured to include a connection bridge 4 extending in a direction orthogonal to the coupling direction of the housing frame 1 and the housing cover 10 and a leg body 5 extending in the coupling direction of the housing frame 1 and the housing cover 10 at the end of the connection bridge 4. In some implementations, a total of three support legs 4 and 5 are configured, and two or four or more support legs 4 and 5 can be configured.

The housing cover 10 and an inverter unit 60 can be coupled to both ends of the leg body 5 of the support legs 4 and 5, respectively, the inverter unit 60 being to be described below. Referring to FIG. 2, the inverter unit 60 can be coupled to the upper end of the leg body 5, and the housing cover 10 is assembled at the lower end of the leg body 5. Therefore, the inverter unit 60 can be spaced apart from the housing cover 10 by the height of the leg body 5, so that the insulation distance can be secured between parts of the inverter unit 60 and parts of the motor unit C. A reference numeral 8 denotes a fastening groove used for coupling with the housing cover 10.

An empty space can be formed between the support legs 4 and 5, so that air can flow into the empty space. The impeller 70, which is to be described below, discharges air in the direction of the inverter while rotating. Herein, the air can be discharged into the empty space between the support legs 4 and 5, and thus not be disturbed by the housing frame 1.

The empty space between the support legs 4 and 5 can refer to a kind of installation space, in which heat generating elements 64a to 64c of the inverter unit 60, and a neutral point terminal 30 and power terminals 40a, 40b, and 40c, etc., which are to be described below, are disposed. Since the installation space is partitioned into multiple spaces by the support legs 4 and 5, the parts can be also partitioned from each other to be installed in different installation spaces, and an insulation distance between the parts can be sufficiently secured. In some examples, three installation spaces are provided.

The housing cover 10 can form at least a part of the outer periphery of the fan motor in some implementations, and has a ring-shaped structure. The housing cover 10 can have a cover body 11 forming the outer periphery, and a second bearing receiving portion 12 provided at the center of the cover body 11, thereby supporting the second bearing 54 of the rotor assembly 50. Both the cover body 11 and the second bearing receiving portion 12 have a ring shape, and a plurality of connection arms 13 can be connected between the cover body 11 and the second bearing receiving portion 12.

A first assembly groove 14 can be provided to correspond to the fastening groove 8 of the housing frame 1, at the outside of the connection arm 13, that is, at one end connected to the cover body 11. In addition, a second assembly groove 15 can be provided inside the connection arm 13 connected to the second bearing receiving portion 12. The second assembly groove 15 can be used for assembling between the diffuser 80 and the connection arm 13, which are to be described below. A first fastener B1 can be fastened into the first assembly groove 14 and the fastening groove 8.

The motor unit C can be installed between the housing frame 1 and the housing cover 10. The motor unit C can include a stator assembly 20 and a rotor assembly 50, in order to implement the rotational operation of the fan motor. The stator assembly 20 is wound with a plurality of coil turns to generate electromagnetic induction, and the rotor assembly 50 is installed inside the stator assembly 20 and a part that actually rotates.

The stator assembly 20 can include a stator core 21 in which a plurality of thin metal plates are stacked and insulators 22a and 22b coupled to the stator core 21 to insulate between the stator core 21 and the coil. The stator assembly 20 can be fixed between the housing frame 1 and the housing cover 10 to surround the rotor assembly 50, so that the rotor assembly 50 can be rotated in the center of the stator assembly 20.

Figure 3:
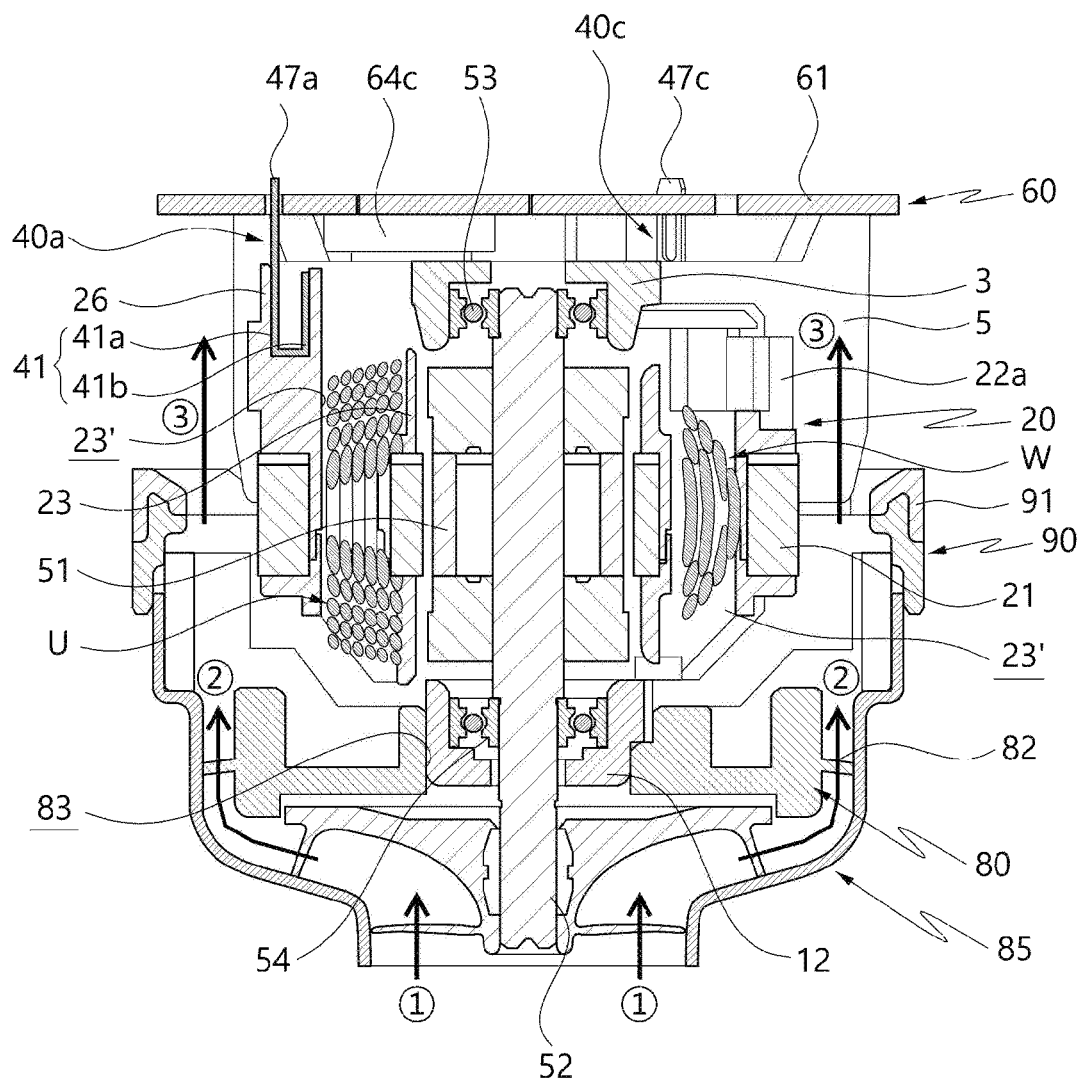
FIG. 3 is a cross-sectional view taken along a line I-I' of FIG. 1.
Figure 4:
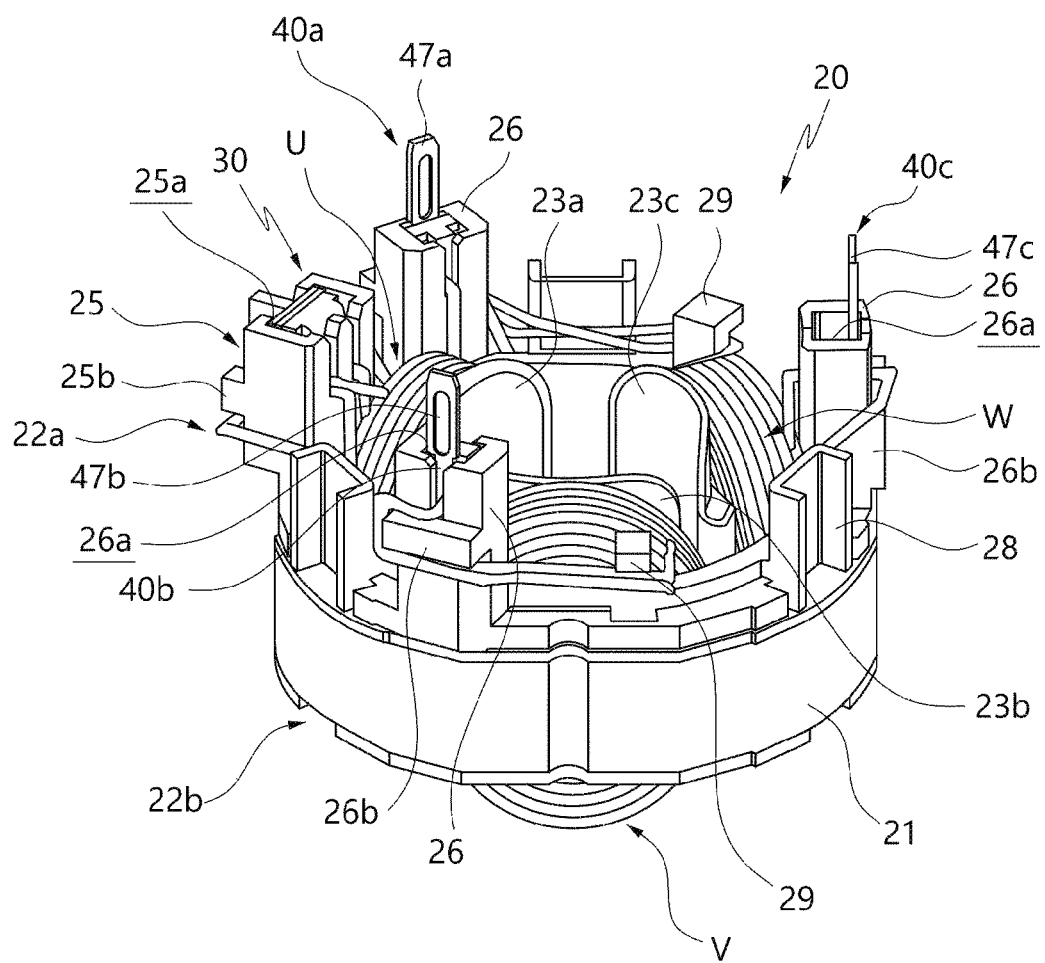
FIG. 4 is a perspective view showing an example of a stator assembly.

Referring to FIGS. 3 and 4, the insulator 22a and 22b can be assembled in the core of the stator assembly 20. In some implementations, the insulator 22a and 22b can be composed of a first insulator 22a and a second insulator 22b. The first insulator 22a and the second insulator 22b are assembled with each other. The first insulator 22a can be located at the top close to the inverter unit 60, and the second insulator 22b can be located at the bottom close to the housing cover 10. In some examples, the order of the first insulator 22a and the second insulator 22b is arbitrarily determined and the order can be reversed. Alternatively, the first insulator 22a and the second insulator 22b can be integrally formed.

A plurality of tooth portions 23 can be provided inside the insulator 22a and 22b, and a slot 23' around which the coil is wound can be formed between the tooth portions 23. That is, the number of slots 23' can be provided as many as the number of tooth portions 23, and in some implementations, there are a total of three tooth portions 23, and the coil can be wound around three slots 23' to form three phases. As described below, in the stator assembly 20, the coil is wound in a Y-connection method to form three phases. For example, the Y-connection method can include three branches, which correspond to the three phases, connect to one terminal to define a Y-shaped connection. In some cases, the three tooth portions 23 can be arranged in a Y-shape according to the three branches. In some implementations, the coil is a single coil including portions corresponding to the three phases, respectively.

In some implementations, the coil can be wound on the tooth portions 23 in a Y connection method, and at least three coils can be separately wound on the tooth portions 23. In some implementations, at least three coils can include a first phase (U phase) coil, a second phase (V phase) coil, and a third phase (W phase) coil. For example, the U phase coil is wound on a first tooth portion 23a, the V phase coil is wound on a second tooth portion 23b, and the W phase coil is wound on a third tooth portion 23c. In other implementations, each of the U phase, V phase, and W phase coils can be named with other letters or numerals.

The insulators 22a and 22b can be provided with a neutral point terminal 30 and power terminals 40a, 40b, and 40c, which are to be described below. Referring to FIG. 4, the insulators 22a and 22b are provided in such a manner that a first storage portion 25 and a second storage portion 26 protrude toward the inverter unit 60. The neutral point terminal 30 is installed in the first storage portion 25, and the power terminals 40a, 40b, and 40c are installed in the second storage portion 26. In some implementations, there are one first storage portion 25 and a total of three second storage portions 26.

Figure 7:
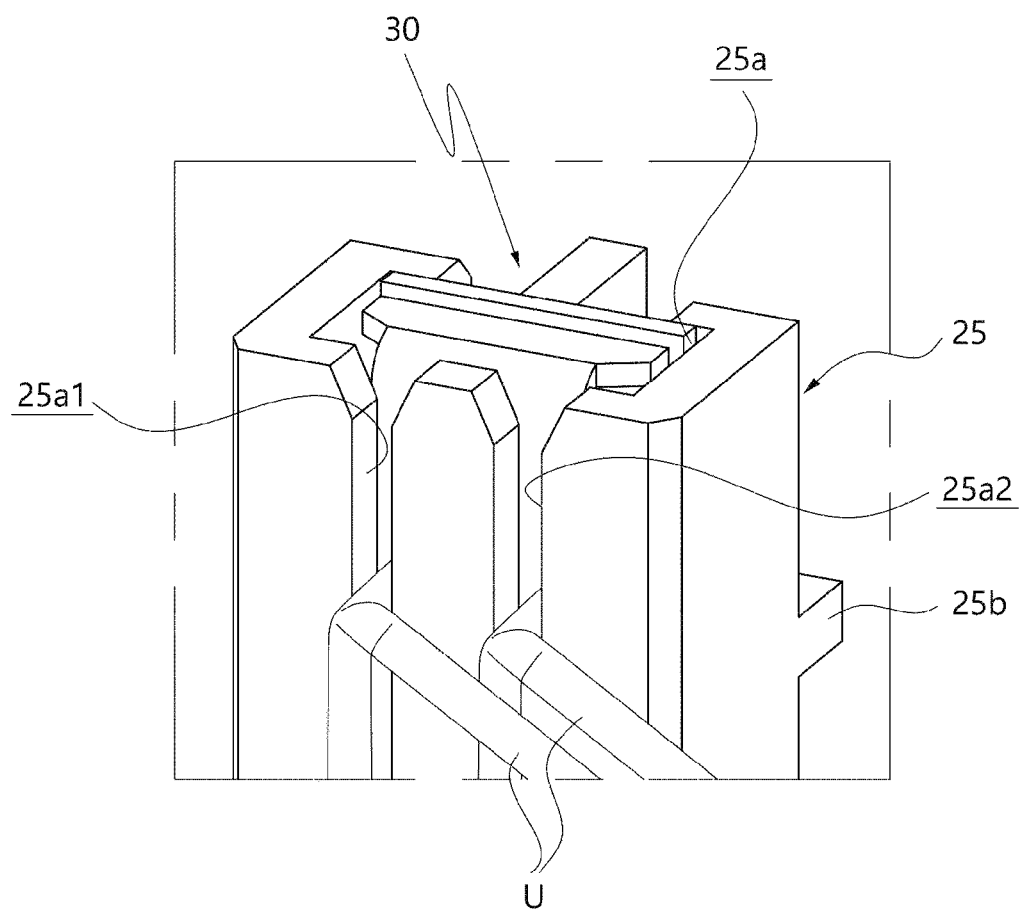
FIG. 7 is a perspective view showing an example state in which a neutral point terminal is assembled to a stator assembly.

Referring to FIGS. 4 and 7, a first storage space 25a can be opened upward in the first storage portion 25 to accommodate the neutral point terminal 30, and two first coil insertion grooves 25a1 and 25a2 are opened in a front-rear direction, that is, in a direction orthogonal to the direction in which the first storage space 25a is opened. The two first coil insertion grooves 25a1 and 25a2 can extend in a direction parallel to each other, and a coil can be inserted into the first coil insertion grooves 25a1 and 25a2 from above. When the neutral point terminal 30 is inserted into the first storage portion 25 in a state that the coil is inserted into the first coil insertion grooves 25a1 and 25a2, the coil can be inserted into the neutral point receiving groove 35 of the neutral point terminal 30 and thus be electrically connected to the neutral point terminal 30.

A first engaging end 25b can protrude from the surface of the first storage portion 25 to allow the coil to be engaged in the first engaging end 25b. That is, the coil partially inserted into the first coil insertion grooves 25a1 and 25a2 of the first storage portion 25 can be engaged by the first engaging end 25b to extend to the adjacent tooth portion 23.

A second storage space 26a can be opened upward in the second storage portion 26 to accommodate the power terminals 40a, 40b, and 40c, and the second coil insertion groove 26a1 can be opened in a front-rear direction, that is, in a direction orthogonal to the direction in which the second storage space 26a is opened. The second coil insertion groove 26a1 can extend in the same direction as the second storage space 26a to allow the coil to be inserted from above. When the power terminals 40a, 40b, and 40c are inserted into the second storage portion 26 in a state where the coil is inserted into the second coil insertion groove 26a1, the coil can be inserted into a power receiving grooves of each of the power terminals 40a, 40b, and 40c to be electrically connected to the power terminals 40a, 40b, and 40c.

A second engaging end 26b can protrude from the surface of the second storage portion 26 to allow the coil to be engaged in the second engaging end 26b. That is, the coil partially inserted into the second coil insertion groove 26a1 of the second storage portion 26 can be engaged by the second engaging end 26b to extend to the adjacent tooth portion 23.

Figure 11:
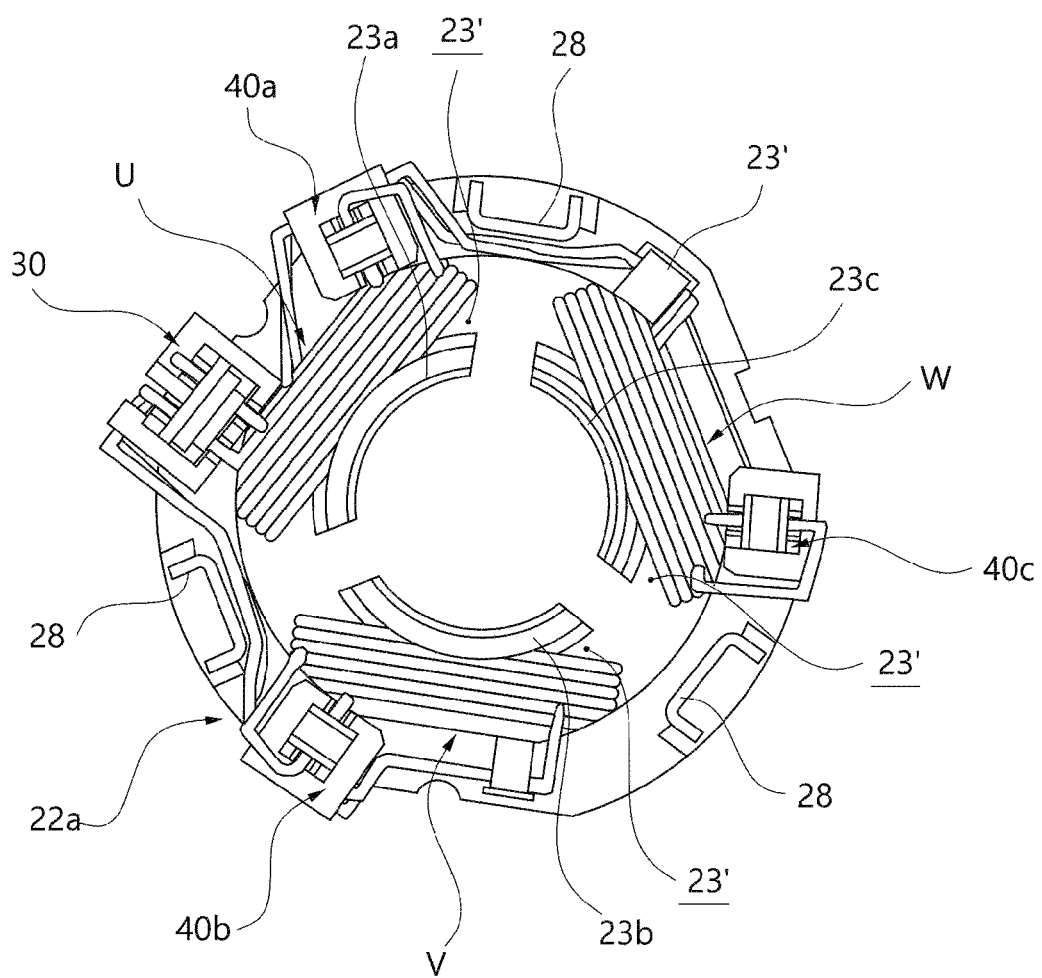
FIG. 11 is a plan view showing an example of a stator assembly.

Referring to FIGS. 4 and 11, three second storage portions 26 are provided at positions on one side of the coil constituting a U-phase, V-phase, and W-phase, respectively. In some implementations, the first storage portion 25 is provided on the opposite side of the coil constituting the U-phase. For reference, references U, V, and W can denote coils constituting a U phase, V phase, and W phase, respectively.

The insulator 22a and 22b can have a leg coupling portion 28. The leg coupling portion 28 can surround the leg body 5 of the support legs 4 and 5 of the housing frame 1, and protrude from the insulator 22a and 22b toward the inverter unit 60. The leg coupling portion 28 can surround a part of the surface of the leg body 5 to increase the coupling area between the insulator 22a and 22b and the housing frame 1, thereby increasing the coupling force. In some implementations, the leg coupling portion 28 has a substantially U-shaped cross section.

The insulator 22a and 22b can have a hook 29. The hook 29 can protrude from the insulator 22a and 22b and serve to hang the coil. That is, the hook 29 accurately guides the moving direction of the coil by hanging a part of the coil, like the first engaging end 25b of the first storage portion 25 and the second engaging end 26b of the second storage portion 26 described above. In some implementations, the hook 29 can have an approximately inverted-L-shaped shape, and a plurality of hooks can be disposed around the edges of the insulators 22a and 22b.

Next, considering the terminal installed in the insulator 22a and 22b, the terminal can be a part electrically connected to the coil. The terminal is composed of a neutral point terminal 30 and power terminals 40a, 40b, and 40c. Herein, the neutral point terminal 30 is composed of a terminal constituting a neutral point, and the power terminals 40a, 40b, and 40c are composed of terminals capable of supplying power. Here, the power terminals 40a, 40b, and 40c can be classified into a first power terminal 40a, a second power terminal 40b, and a third power terminal 40c.

Figure 8:
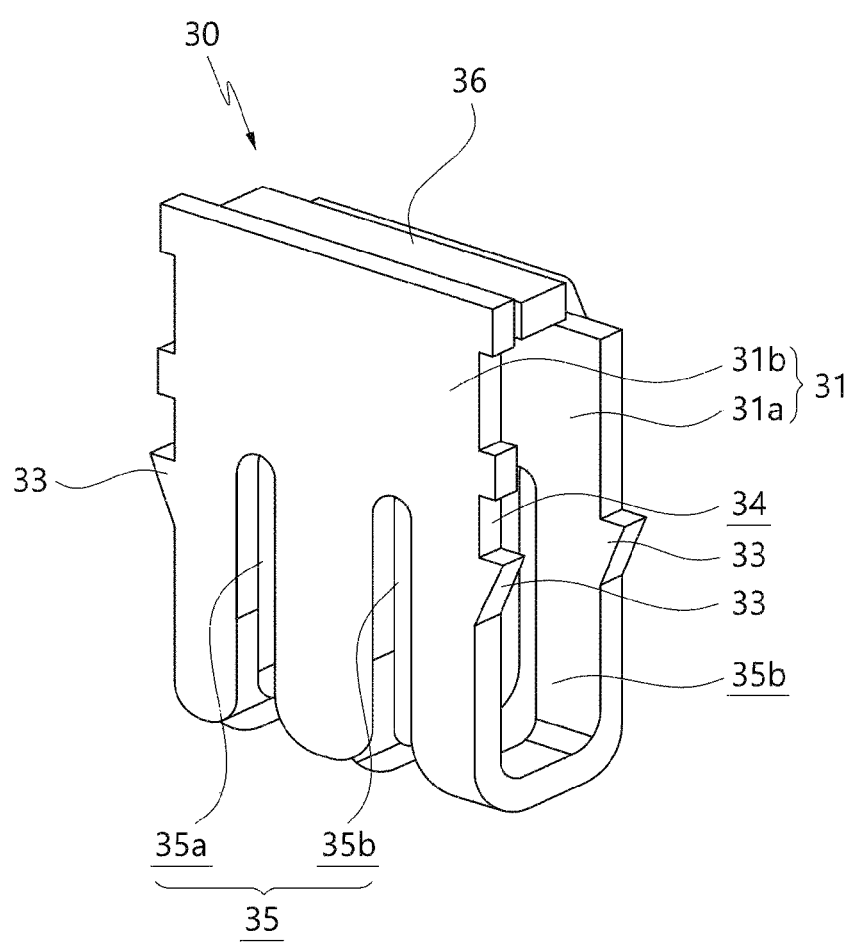
FIG. 8 is a perspective view showing an example of a neutral point terminal.
Figure 9:
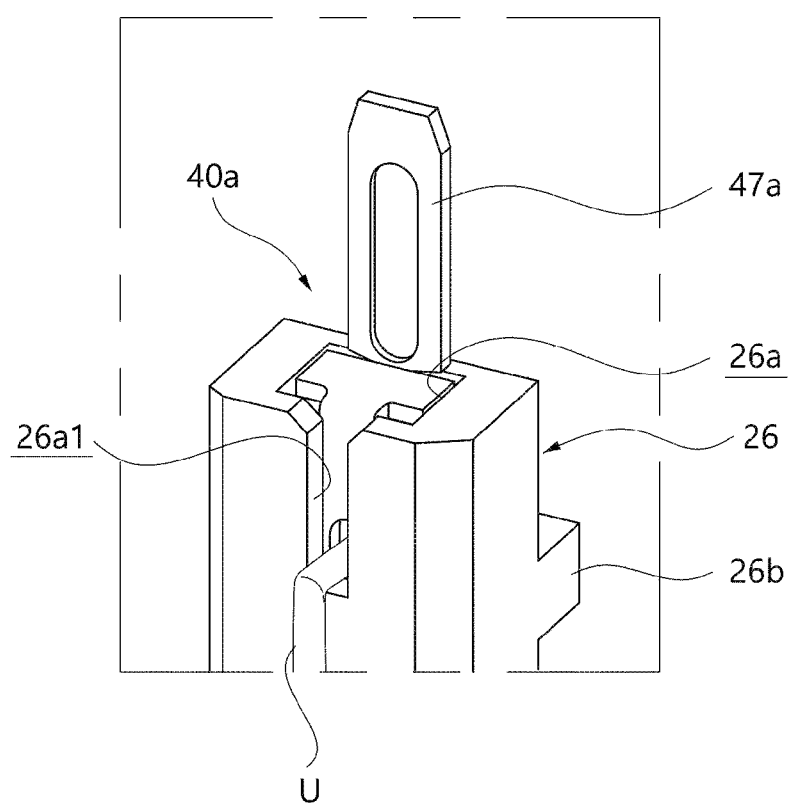
FIG. 9 is a perspective view showing an example state in which a power terminal is assembled to a stator assembly.
Figure 10:
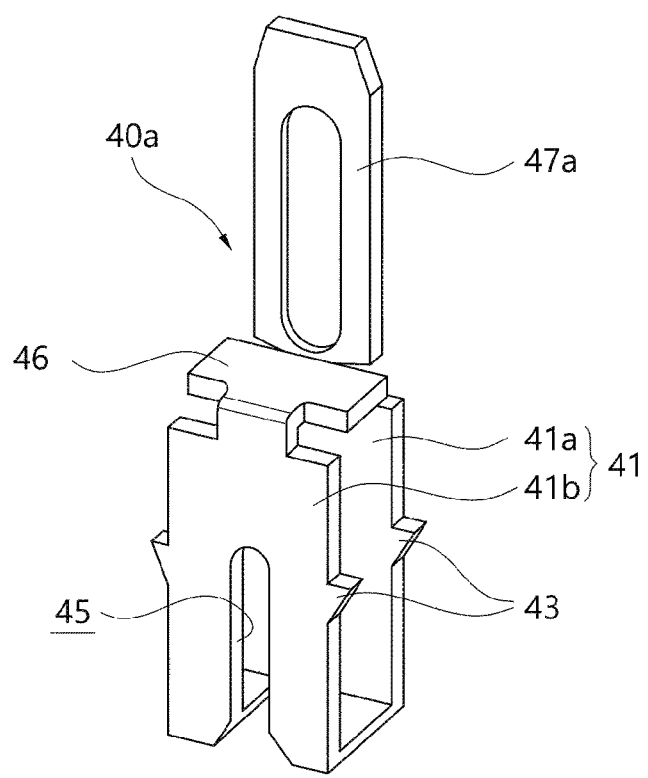
FIG. 10 is a perspective view showing an example of a power terminal.

Referring to FIG. 8, considering the neutral point terminal 30, the neutral point terminal 30 can be composed of a first plate 31a and a second plate 31b bent from the first plate 31a to extend to face the first plate 31a. The first plate 31a and the second plate 31b can constitute a neutral point terminal body 31, and a locking protrusion 33 can protrude from a side surface of the neutral point terminal body 31. The locking protrusion 33 can be a portion that allows the neutral point terminal 30 to be locked into the first storage portion 25, and is provided on both sides. A reference numeral 34 denotes a locking groove which is relatively recessed adjacent to the locking protrusion 33, and a locking protrusion provided inside the first storage space 25a can be locked in the locking groove 34.

A connection rib 36 can be provided at the upper end of the first plate 31a, and the connection rib 36 can protrude from the upper end of the first plate 31a toward the second plate 31b. The connection rib 36 can fill the gap between the first plate 31a and the second plate 31b. It can be appreciated that the connection rib 36 takes a role in maintaining the three-dimensional shape of the neutral point terminal 30. In some examples, the connection rib 36 can protrude from the second plate 31b toward the first plate 31a.

A neutral point receiving groove 35 into which the coil of the stator assembly 20 is inserted can be formed in the first plate 31a and the second plate 31b. The coil can be inserted into the neutral point receiving groove 35, and the neutral point receiving groove 35 can extend in a direction in which the neutral point terminal 30 is accommodated in the first storage portion 25. In addition, the neutral point receiving groove 35 is opened downward, so that the coil can be inserted through the opened portion. In some implementations, the coil is fitted into the neutral point receiving groove 35 while coupling the neutral point terminal 30 to the first storage portion 25, in a state that the coil is first inserted into the first coil insertion grooves 25a1 and 25a2 of the first storage portion 25.

Figure 14A:
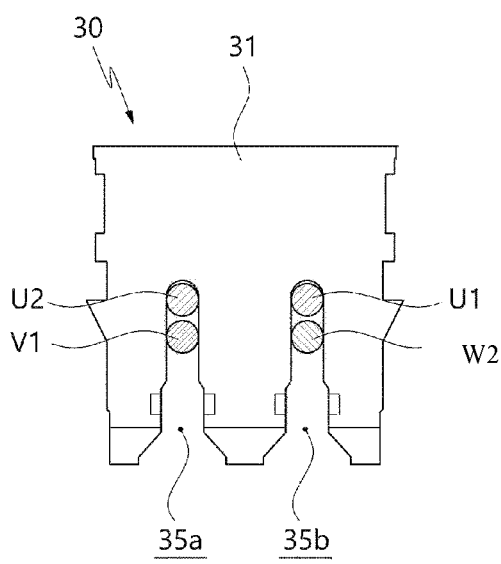
FIGS. 14A and 14B are front views showing example states in which a coil is coupled to a neutral point terminal.
Figure 14B:
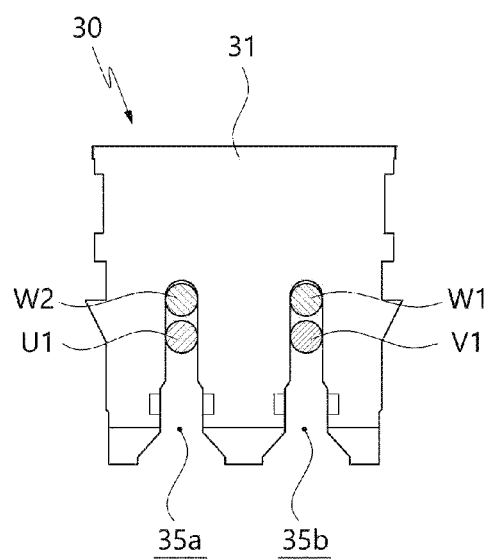

The neutral point receiving groove 35 can be provided in a pair. A plurality of coils is inserted in such a manner as to be stacked in the pair of neutral point receiving grooves 35, and in some implementations, each coil constituting three phases, which is provided in the stator assembly 20, is inserted into the neutral point receiving grooves 35. The first groove portion 35a and the second groove portion 35b constituting the neutral point receiving groove 35 can form a kind of fork shape, and a state in which the coil is inserted into the first and second groove portions 35a and 35b is shown in FIGS. 14A and 14B.

Referring to 14A, as an example, into the first groove portion 35a are inserted a via end U2 at which a coil constituting a U phase is wound and then the winding is passed to a coil constituting a V phase, and a via end V1 at which a coil constituting a V phase is wound and then the winding is passed to a coil constituting a W phase. In addition, into the second groove portion 35b are inserted a start end U1 at which the winding of a coil constituting a U phase is started and a termination end W1 at which the winding of the coil constituting the W phase is terminated. Accordingly, the neutral point terminal 30 constitutes the neutral point of a three-phase coil.

Here, the start end U1 can refer to a part where the winding of the coil starts, and the termination end W1 can refer to a part where the winding of the coil is completed. In addition, the two via ends U2 and V1 can refer to parts that pass through the neutral point receiving groove 35 of the neutral point terminal 30, in the process where the coil is primarily wound and secondarily wound on any one of the tooth portions 23a to 23c and then is moved to another of the tooth portions 23a to 23c.

The neutral point terminal 30 can be provided with the first plate 31a and the second plate 31b facing each other, so that the neutral point receiving groove 35 is also formed on each of the first plate 31a and the second plate 31b. That is, a pair of neutral point receiving grooves 35 is provided to be spaced apart from each other in the front-rear direction. Therefore, since a portion where the coil is fitted into the neutral point terminal 30 becomes two points, electrical connection between the coil and the neutral point terminal 30 can be made more stably.

Figure 13:
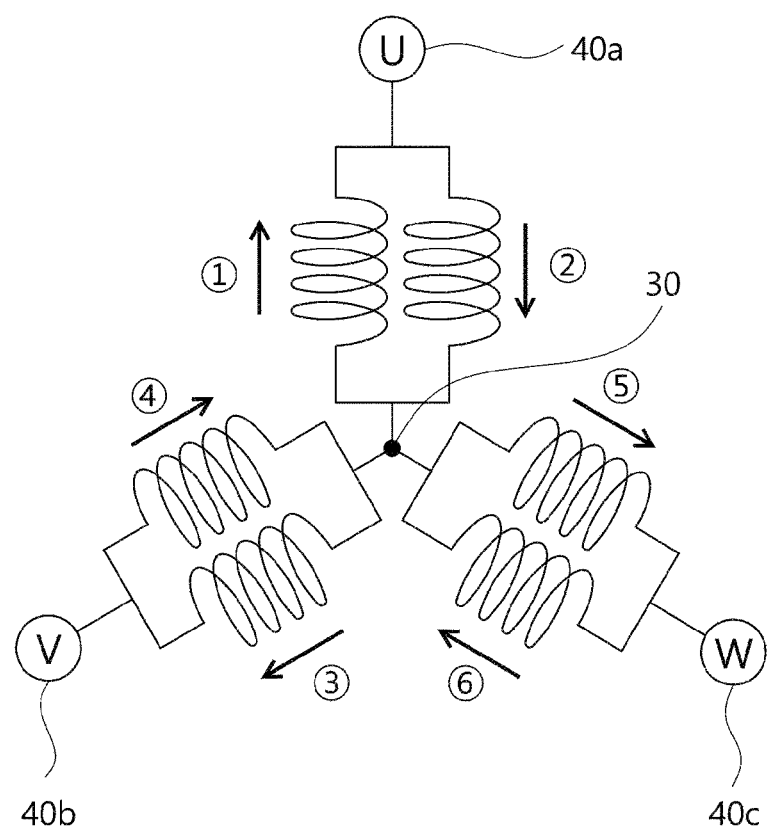
FIG. 13 is a circuit diagram showing an example of a coil connection structure of a stator assembly.

FIG. 13 shows the power terminals 40a, 40b, and 40c. The power terminals 40a, 40b, and 40c can be connected to the coils of the respective phase and serve to supply power to the coils constituting the respective phases. Each of the power terminals 40a, 40b, and 40c can be composed of a first connecting body 41a and a second connection body 41b that is bent from the first connection body 41a and extends to face the first connection body 41a. The first connection body 41a and the second connection body 41b constitute a power terminal body 41, and an engaging projection 43 protrudes from the side of the power terminal body 41. The engaging projection 43 can be a portion that allows the power terminals 40a, 40b, and 40c to be engaged in the second storage portion 26, and a pair of engaging projections 43 is provided on both of the first connection body 41a and the second connection body 41b.

A connection rib 46 can be provided at an upper end of the second connection body 41b. The connection rib 46 can protrude from the upper end of the second connection body 41b toward the first connection body 41a. The connection rib 46 can fill the gap between the first connection body 41a and the second connection body 41b. It can be appreciated that the connection rib 46 takes a role of maintaining the three-dimensional shape of the power terminals 40a, 40b, and 40c. In some examples, the connection rib 46 can protrude from the first connection body 41a toward the second connection body 41b.

Tab portions 47a, 47b, and 47c can protrude from the top of the first connection body 41a. That is, the tab portions 47a, 47b, and 47c can protrude upward, that is, toward the inverter unit 60 from the first connection body 41a, and thus be partially inserted into the inverter unit 60 to be electrically connected.

The power receiving groove 45, into which the coil of the stator assembly 20 is inserted, can be formed in the first connection body 41a and the second connection body 41b. The coil is inserted into the power receiving groove 45, and the power receiving groove 45 extends in a direction in which the power terminals 40a, 40b, and 40c are accommodated in the second storage portion 26. In addition, the power receiving groove 45 is opened downward, so that the coil can be inserted through the opened portion. In some implementations, the coil can be inserted into the power receiving groove 45 while coupling the power terminals 40a, 40b, and 40c to the second storage portion 26, in the state that the coil is first inserted into the second coil insertion groove 26a1 of the second storage portion 26.

The power terminals 40a, 40b, and 40c can be provided with the first connection body 41a and the second connection body 41b facing each other, so that the power receiving groove 45 is also formed in each of the first connection body 41a and the second connection body 41b. That is, a pair of power receiving grooves 45 is provided to be spaced apart from each other in the front-rear direction. Therefore, since the coil is inserted into the power terminals 40a, 40b, and 40c at two points, the electrical connection between the coil and the power terminals 40a, 40b, and 40c can be made more stably.

In some examples, as shown in FIG. 2, the rotor assembly 50 located inside the stator assembly 20 can be configured to surround the rotation shaft 52 located at the center thereof. Here, the rotor assembly 50 is rotationally disposed in the stator assembly 20. The rotor assembly 50 can be configured so that a disk-shaped core plate 51 is stacked and a magnet is disposed on an outer circumferential surface thereof. The rotor assembly 50 is rotated by electromagnetic induction generated between the magnet and the stator assembly 20, and the rotation shaft 52 rotates integrally with the rotor assembly 50.

The rotor assembly 50 can include a first bearing 53 and a second bearing 54. The first bearing 53 and the second bearing 54 are spaced apart from each other. More precisely, the first bearing 53 can be provided relatively closer to the inverter unit 60, and the second bearing 54 is provided closer to the housing cover 10. The first bearing 53 can be fitted into the first bearing receiving portion 3 of the housing frame 1, and the second bearing 54 is fitted into the second bearing receiving portion 12 of the housing cover 10.

The inverter unit 60 can be coupled to the housing frame 1. The inverter unit 60 is a power supply device configured to be capable of varying a frequency to operate a fan motor at an arbitrary speed. That is, the inverter unit 60 can perform an operation of arbitrarily changing the frequency by varying the switching interval. In some implementations, the inverter unit 60 can be provided integrally with the fan motor and serves to supply power to the coil of the stator assembly 20.

The inverter unit 60 can serve to apply three-phase power to the U, V, and W phases realized by the coil. To this end, the inverter unit 60 converts a rectified DC voltage into a predetermined AC voltage according to each phase and outputs the same. In addition, the fan motor can be driven according to the voltage input through the inverter unit 60. That is, current flows through the wound coil on each phase U, V, and W of the stator assembly 20 by the predetermined AC voltage converted by the inverter unit 60, so that a rotating magnetic field can be generated by the interaction of the magnetic field formed by the current and the magnet of the rotor assembly 50 to rotate the rotor assembly 50.

The inverter unit 60 can include a circuit board 61 and a plurality of heat generating elements 64a to 64c mounted on the circuit board 61. The heat generating elements 64a to 64c can include electric circuits or devices including transistors, MOSFETs, capacitors 64a to 64c for switching, or the like, but are not limited thereto. Since a lot of heat is generated from the heat generating elements 64a to 64c, it is necessary to effectively remove the heat of the heat generating elements 64a to 64c. Such a cooling structure will be described below.

The circuit board 61 can be provided with a connector part 62 for receiving power from the outside, a sensing part 63 for sensing, and the like. The circuit board 61 can have a substantially disk shape. In some implementations, the circuit board 61 is concentric with the housing cover 10, and a diameter of the circuit board 61 is smaller than or equal to that of the housing cover 10.

Figure 5:
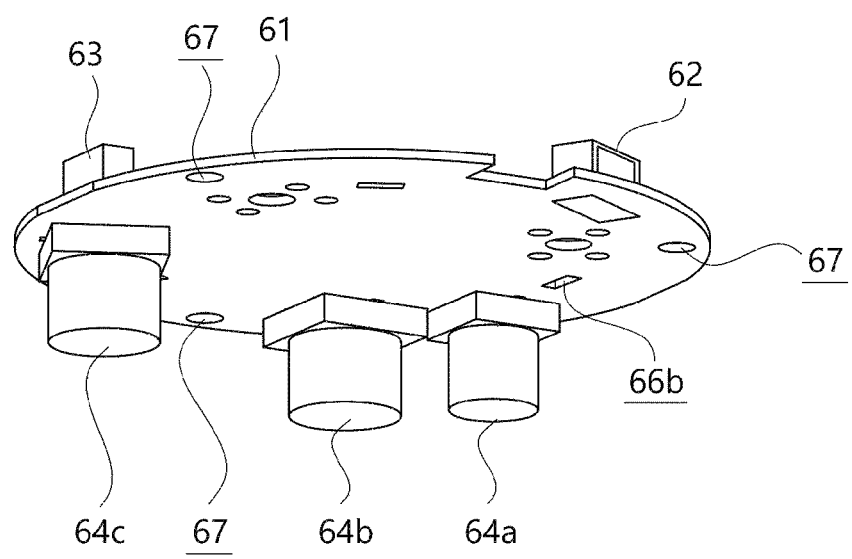
FIG. 5 is a perspective view showing an example of an inverter.
Figure 6:
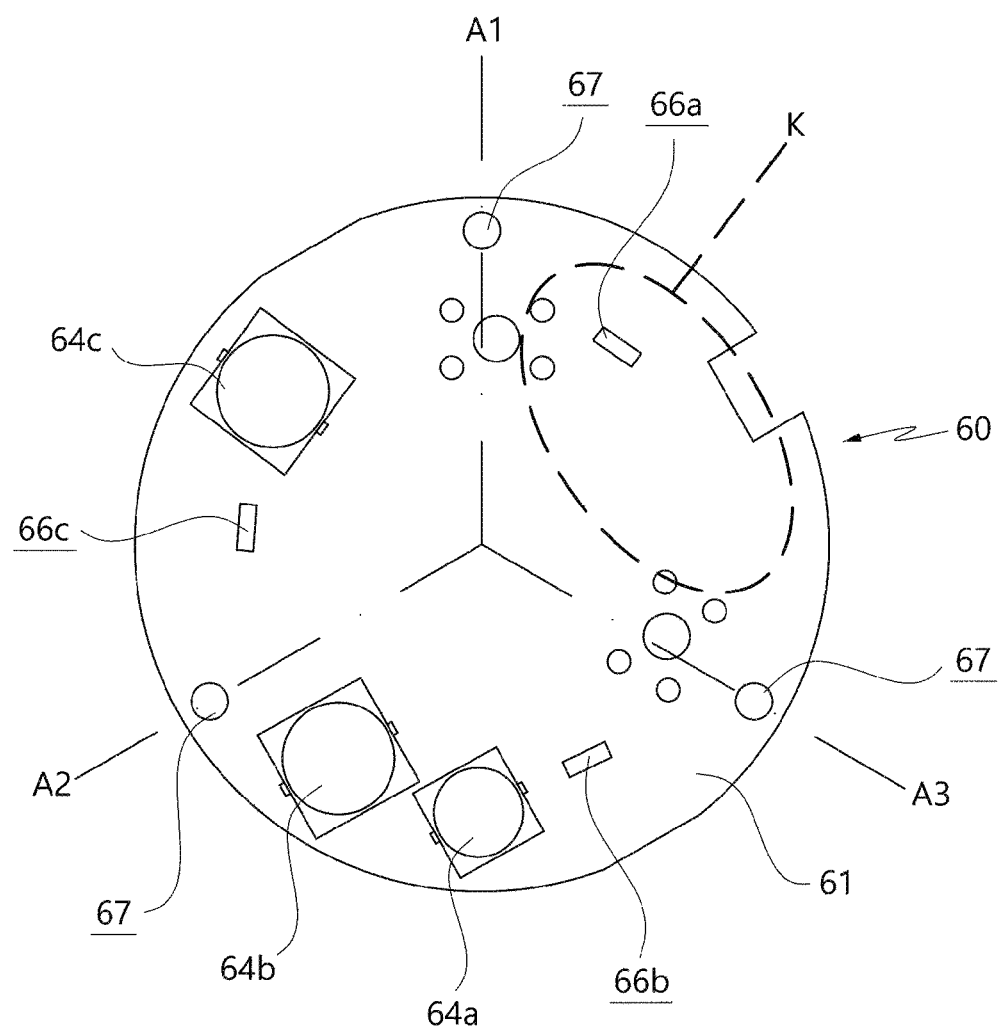
FIG. 6 is a plan view showing an example of an inverter.

Referring to FIGS. 5 and 6, the heat generating elements 64a to 64c can be mounted on the bottom surface of the circuit board 61, that is, the surface facing the housing cover 10 and the impeller 70. The heat generating elements 64a to 64c include MOSFETs or capacitors 64a to 64c for switching. Herein, the capacitors 64a to 64c are cylindrical capacitors 64a to 64c. In some implementations, a total of three capacitors 64a to 64c can be provided. Alternatively, two or less or four or more capacitors can be mounted on the circuit board 61.

In some implementations, the heat generating elements 64a to 64c can be provided to protrude from the bottom of the circuit board 61 toward the impeller 70, so that air discharged from the impeller 70 can be discharged to the outside through the heat generating elements 64a to 64c. In addition, the overall height of the fan motor can be lowered by at least the height of the heat generating elements 64a to 64c, compared to when the heat generating elements 64a to 64c can be provided upward (upward in FIG. 1) from the top of the circuit board 61.

Herein, the capacitors 64a to 64c can be installed closer to the outer edge than the center of the circuit board 61. Accordingly, the capacitors 64a to 64c are clearly revealed between the support legs 4 and 5 of the housing frame 1 as shown in FIG. 1. When the capacitors 64a to 64c are mounted on the outer edge of the circuit board 61, the heat generating elements 64a to 64c can be positioned on the discharge path in which the air is discharged to the outside of the fan motor through the impeller 70 and the diffuser 80. Accordingly, the heat generating elements 64a to 64c are cooled by the impeller 70 and the diffuser 80, thereby preventing deterioration of the fan motor due to heat generation. That is, since the air discharged by the impeller 70 is directly transmitted to the heat generating elements 64a to 64c, the heat generating elements 64a to 64c can be cooled without a separate cooling device.

Referring to FIGS. 5 and 6, a plurality of coupling holes 67 can be provided in the circuit board 61, and a part of the support legs 4 and 5 of the housing frame 1 can be fitted into the coupling holes 67. For instance, when a portion protruding from the support legs 4 and 5 is inserted into the coupling hole 67, the circuit board 61 can be fixed to the housing frame 1. Herein, the circuit board 61 can be fixed to the housing frame 1 more firmly via a method such as soldering.

The circuit board 61 can be provided with tap holes 66a to 66c. The tap holes 66a to 66c are made through the circuit board 61, and the ends of the respective tap portions 47a to 47c of the respective power terminals 40a to 40c described above can pass through the respective tap holes 66a to 66c. When the ends of the tab portions 47a to 47c are soldered through the tap holes 66a to 66c, the tab portions 47a, 47b, and 47c can be fixed to the circuit board while being electrically connected to the circuit board 61. The tap holes 66a to 66c are formed in the circuit board 61 according to the number and position of the three power terminals 40a, 40b, and 40c.

An impeller 70 can be assembled in the rotor assembly 50. The impeller 70 has a shaft coupling hole 73, into which the rotation shaft 52 is vertically inserted, at the center thereof. The shaft coupling hole 73 can be formed in the hub 71 supporting the overall rigidity of the impeller 70, so that the rotational force of the rotation shaft 52 can be well transmitted to the impeller 70.

The hub 71 can have a flat plate structure, or can have an inclination surface that is inclined downward in the radial direction from the center of rotation. A plurality of blades 72 can be radially provided on the bottom of the hub 71 to pressurize air. In order to increase the suction efficiency of the impeller 70, the upper end of the blade 72 can be in close contact with the inner surface of a fan cover 85.

A diffuser 80 can be stacked on the impeller 70. The diffuser 80 serves to guide the air sucked through an air inlet 87 of the fan cover 85 toward the inverter unit 60. In more detail, the diffuser 80 can include a guide body 81 having the form of a disk, and a plurality of guide vanes 82 formed on the outer circumferential surface of the guide body 81.

In some implementations, a shaft through hole 83 can be formed in the center of the guide body 81, and at least a part of the second bearing 54 of the rotor assembly 50 can be accommodated in the shaft through hole 83. A plurality of guide holes 84 can be formed around the shaft through hole 83. The guide hole 84 can correspond to the second assembly groove 15, and the guide hole 84 can be fastened to the second assembly groove 15 through a second faster B2.

The fan cover 85 can be coupled to the opposite side of the diffuser 80 on the basis of the impeller 70. The fan cover 85 covers at least a part of the housing cover 10, and in some implementations, the housing cover 10 and the fan cover 85 can be coupled to each other using the bracket 90. The body 91 of the bracket 90 can be ring-shaped with a central portion 92 being empty to surround the housing cover 10. In some examples, unlike this, the fan cover 85 can be directly connected to the housing cover 10.

An air inlet 87, through which air is sucked into the fan motor, can be provided in the upper central portion of the fan cover 85. The fan cover body 86 of the fan cover 85 has a shape inclined downward from the air inlet 87 as it moves away from the central axis of the fan motor, and the lower end of the fan cover 85 covers the housing cover 10. Since the fan cover 85 does not directly support the motor unit C, among parts of the fan motor, the fan cover 85 can be made of a lightweight synthetic resin material.

Referring to FIG. 3, the air (arrow ①) introduced into the air inlet 87 of the fan cover 85 is pressurized and discharged by the impeller 70, moves along the guide vanes 82 of the diffuser 80 (arrow ②), and finally is discharged from the fan cover 85 toward the inverter unit 60 (arrow ③). Therefore, the air discharged by the impeller 70 can result in cooling the heat generating elements 64a to 64c of the inverter unit 60.

In some examples, since the heat generating elements 64a to 64c are located on a path through which air is discharged, such cooling can be performed more effectively.

In some examples, referring to FIGS. 1 and 6, the plurality of heat generating elements 64a to 64c can be installed on the circuit board 61 constituting the inverter unit 60, and terminals coupled to the stator assembly 20 can be disposed between the heat generating elements 64a to 64c. Referring to FIG. 6, virtual extension lines A1, A2, and A3 can be located along the direction in which the support legs 4 and 5 of the housing frame 1 extend on the basis of the center of the circuit board 61, and it can be appreciated that the installation space is compartmented into multiple installation spaces between the extension lines.

Herein, in some of the multiple installation spaces, only the terminals coupled to the stator assembly 2 can be arranged, or only the heat generating elements 64a to 64c can be arranged. Referring to FIG. 6, both the heat generating elements 64a to 64c and the third power terminal 40c can be disposed in a first installation space from the line A1 to the line A2, and only the neutral point terminal 30 and the first power terminal 40a can be arranged in a third installation space from the line A3 to the line A1 marked with a reference symbol K.

Herein, the neutral point receiving groove 35 can include a first groove portion 35a and a second groove portion 35b. When the neutral point terminal 30 has a wide width in a horizontal direction, the neutral point terminal can interfere with other components (heat generating elements 64a to 64c). However, in some implementations, the heat generating elements 64a to 64c can be excluded in the installation space from the line A3 to the line A1 where the neutral point terminal 30 is disposed, thereby preventing such interference. In some examples, this makes it possible to secure enough insulation distance between the components. For example, two heat generating elements 64a to 64c and one second power terminal 40b can be disposed in a second installation space from the line A2 to the line A3.

Next, a process, in which the coil of the motor according to the present disclosure is wound, will be described with reference to FIGS. 11 to 14. First, FIG. 11 shows a plan view of the stator assembly 20 constituting the motor. As can be shown, a total of three coils are wound in the stator assembly 20 in a separate manner, each constituting three phases (U phase, V phase, and W phase). In fact, the coils constituting these three phases are not disconnected from each other, but are wound in a continuous manner. Accordingly, the coils can be separately wound around different tooth portions 23a to 23c and connected to different power terminals 40a, 40b, and 40c.

Figure 12:
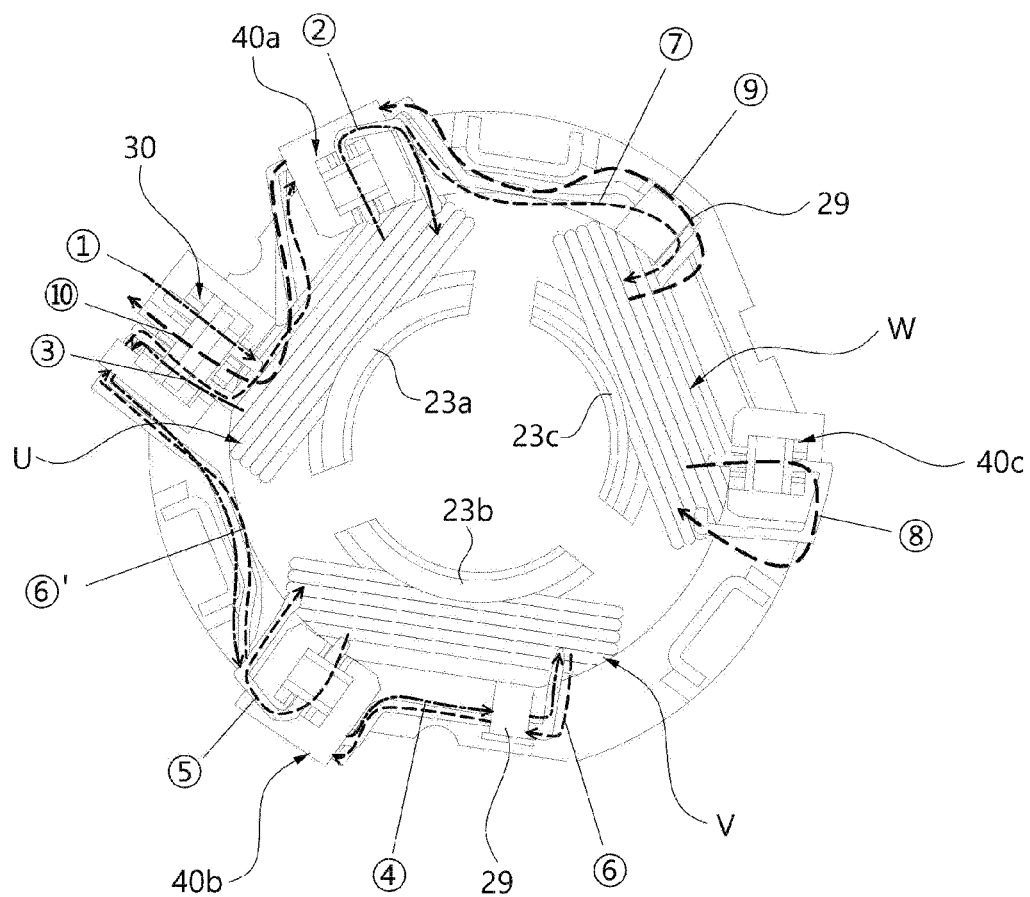
FIG. 12 is a conceptual diagram showing an example sequence in which the coil is wound on a stator assembly.

Referring to FIG. 12, in a process of winding the coil, a start end of the coil constituting the U-phase of the three phases is first inserted into the first groove portion 35a or the second groove portion 35b of the neutral point terminal 30 (arrow ①). In addition, the coil is wound around the first tooth portion 23a, which is one of the tooth portion 23, a plurality of times, passes by the first power terminal 40a, and then is wound around the first tooth portion 23a in an overlapping manner (arrow ②). Therefore, the U phase has a parallel configuration as shown in FIG. 13.

Then, after the coil is fitted into the first groove portion 35a or the second groove portion 35b of the neutral point terminal 30 (arrow ③), the coil moves while surrounding the surface of the first insulator 22a in a counterclockwise direction. Herein, the coil passes by the surface of the second storage portion 26 in which the second power terminal 40b adjacent to the second tooth portion 23b constituting the V phase is accommodated (arrow ④). In addition, after the coil is hooked on the hook 29, the coil is wound around the second tooth portion 23b, which is another of the tooth portion 23, a plurality of times, then inserted into the second power terminal 40b, and then wound around the second tooth portion 23b in an overlapping manner (arrow ⑤). Therefore, the V phase has a parallel configuration as shown in FIG. 13.

In addition, the coil can move while surrounding the surface of the first insulator 22a in a clockwise direction (arrow ⑥), and can be inserted into the first groove portion 35a or the second groove portion 35b of the neutral point terminal 30 (arrow ⑥').

Subsequently, the coil moves while surrounding the surface of the first insulator 22a in a clockwise direction, and is wound around the third tooth portion 23c, which is the remaining the tooth portions 23 constituting the W phase (arrow ⑦). The coil wound around the third tooth portion 23c a plurality of times is fitted into the third power terminal 40c, and is wound around the third tooth portion 23c in an overlapping manner (arrow ⑧). Therefore, the W phase has a parallel configuration as shown in FIG. 13.

Then, the coil moves while surrounding the surface of the first insulator 22a in a counterclockwise direction (arrow ⑨), and finally, the coil is fitted into the first groove portion 35a or the second groove portion 35b of the neutral point terminal 30 (arrow ⑩).

As a result, as shown in FIG. 14A, the starting end U1 constituting the U phase and the terminating end W2 of the coil at which the winding of the coil constituting the W phase is terminated can be fitted into the second groove portion 35b of the neutral point terminal 30 at different heights from each other. In addition, the via end U2 of the coil moving to wind the V phase after winding the U phase and the via end V1 of the coil moving to wind the W phase after winding the V phase can be fitted into the first groove portion 35a at different heights from each other.

For reference, the order in which the coils are fitted into the neutral point terminal 30 is not limited thereto, and can be changed as shown in FIG. 14B. That is, since the neutral point terminal 30 only has to configure a neutral point, the order and position in which the coils are inserted can be variously modified. In addition, the order in which the coils are wound can be started from W phase instead of U phase.

As a result, in some implementations, the stator core 21 of the stator assembly 20 can be provided with three slots 23', so that the coil is composed of three phases of U, V, and W. The coil is wound in the slot 23', passes by the power terminals 40a, 40b, and 40c, and then is wound in an overlapping manner, so that the coil is disposed in parallel between the neutral point terminal 30 and the power terminals 40a, 40b, and 40c.

In some implementations, two strands of coil are not wound at the same time, but are wound on each slot 23' in such a manner that the coil is primarily wound, passes by the power terminal 40a, 40b, and 40c, and then secondarily wound, so that each phase is connected in parallel.

An example configuration is shown in FIG. 13. Referring to FIG. 13, the winding order of the coil will be described again. The coil started from the neutral point terminal 30 constituting the neutral point is wound around the first tooth portion 23a constituting the U phase (arrow ①), passes by the first power terminal 40a, and then wound around the same first tooth portion 23a again (arrow ②), whereby the U-phase is connected in parallel.

In addition, the coil passes by the neutral point terminal 30, which is a neutral point, is wound around the second tooth portion 23b constituting the V phase (arrow ③), passes by the second power terminal 40b, and then is wound around the same second tooth portion 23b again (arrow ④), whereby the V phase is connected in parallel.

Subsequently, the coil passes by the neutral point terminal 30, which is a neutral point, is wound around the third tooth portion 23c constituting the W phase (arrow ⑤), passes by the third power terminal 40c, and then is wound around the same third tooth portion 23c again (arrow ⑥), whereby the W phase is also connected in parallel.

In some examples, arrow ① and arrow ② can refer to a U phase primary winding and a U phase secondary winding. arrow ③ and arrow ④ can refer to a V phase primary winding and a V phase secondary winding. arrow ⑤ and arrow ⑥ can refer to a W phase primary winding and a W phase secondary winding.

As described, in some implementations, since each phase is connected in parallel and the number of tooth portions 23 is the same as the number of phases, the structure can be simple, and winding can be easily made without a need to wind two coils at the same time. In particular, since each phase is configured in parallel, it is possible to achieve high performance without increasing the diameter of the coil.

In some implementations, although each phase is connected in parallel, the coil constituting each phase can be inserted into the neutral point terminal 30 on a per-strand basis, according to the method as described above. Accordingly, in some implementations, the neutral point receiving groove 35 for the neutral point terminal 30 can be composed of only two grooves (a first groove portion 35a and a second groove portion 35b). Thus, the left and right widths of the neutral point terminal 30 can be reduced, and the interference section with the heat generating elements 64a to 64c can be also reduced.

In some examples, the coil can be primarily wound around each of the tooth portions 23a to 23c, secondarily wound around the first tooth portion 23a in an overlapping manner via the first power terminal 40a, passes by the neutral point terminal 30, secondarily wound around the second tooth portion 23b in an overlapping manner via the second power terminal 40b, passes by the neutral point terminal 30 again, and then is secondarily wound around the third tooth portion 23c in an overlapping manner via the third power terminal 40c.

Although the fan motor in which the inverter unit 60 is integrally configured has been described as an example in the above-disclosed implementation, the present disclosure is not limited thereto. The inverter unit 60 can be configured separately, or can also be applied to a motor that perform various functions, in addition to the fan motor.

As described above, just because all the components constituting of the cleaner in some implementations of the present disclosure have been described as being combined into one or operating in the combination, the present disclosure is not necessarily limited to this implementation. That is, when it is within the scope of the purpose of the present disclosure, all the components can be selectively combined into more than one and operated. In addition, terms such as "include", "constitute", or "have" described above, unless otherwise stated, mean that the corresponding component can be present. Accordingly, it should be construed that other components are not excluded, but can be included. All terms, including technical or scientific terms, have the same meaning as commonly understood by those skilled in the technical field to which the present disclosure belongs, unless defined otherwise. Commonly used terms, such as terms defined in the dictionary, should be interpreted as being consistent with the context of the relevant technology, and in the present disclosure, unless explicitly defined, should not be interpreted as having an ideal or excessively formal meaning.

The above description is merely illustrative of the technical idea of the present disclosure, and those of ordinary skill in the art to which the present disclosure pertains will be able to make various modifications and variations without departing from the essential characteristics of the present disclosure. Accordingly, the implementations disclosed in the present disclosure are not intended to limit the technical idea of the present disclosure, but to explain the technical idea, and the scope of the technical idea of the present disclosure is not limited by these implementations. The scope of protection of the present disclosure should be interpreted by the following claims, and all technical ideas within the scope equivalent thereto should be interpreted as being included in the scope of the present disclosure.

What is claimed is:

1. A motor comprising:
   a rotor assembly configured to rotate with a rotation shaft; and
   a stator assembly that accommodates the rotor assembly, wherein the stator assembly comprises:
      a stator core including a plurality of tooth portions that correspond to a first phase current, a second phase current, and a third phase current, respectively,
      a coil that is wound around the plurality of tooth portions, the coil defining a three-phase Y connection of the first phase current, the second phase current, and the third phase current,
      a neutral point terminal that defines a neutral point of the three-phase Y connection, and
      a plurality of power terminals configured to communicate the first phase current, the second phase current, and the third phase current with the three-phase Y connection,
   wherein the coil includes a primary winding and a secondary winding that are wound around each of the plurality of tooth portions, that are electrically connected parallel to each other, and that are connected to each of the plurality of power terminals,
   wherein the neutral point terminal has two neutral point receiving grooves that are spaced apart from each other in a left-right width direction of the neutral point terminal, and
   wherein the two neutral point receiving grooves accommodate:
      a first phase via end that is disposed at a first portion of the coil defining the first phase current and that connects to a second portion of the coil defining the second phase current,
      a second phase via end that is disposed at the second portion of the coil defining the second phase current and that connects to a third portion of the coil defining the third phase current after the secondary winding corresponding to the second phase current,
      a start end of the coil that starts the primary winding corresponding to the first phase current, and
      a terminating end of the coil that terminates the secondary winding corresponding to the third phase current.

2. The motor of claim 1, wherein the coil includes terminating ends that are connected to each other at the neutral point terminal.

3. The motor of claim 2, wherein the primary winding of one tooth portion among the plurality of tooth portions extends to the neutral point terminal, and then connects to the secondary winding of the one tooth portion, and wherein the secondary winding of the one tooth portion connects to the primary winding of another tooth portion among the plurality of tooth portions.

4. The motor of claim 3, wherein the neutral point terminal defines a plurality of neutral point receiving grooves that include the two neutral point receiving grooves and that accommodate the start end, the terminating end, and a plurality of via ends of the coil including the first phase via end and the second phase via end.

5. The motor of claim 4, wherein the plurality of via ends are portions of the coil that connect one of the plurality of tooth portions to another of the plurality of tooth portions.

6. The motor of claim 1, wherein each of the two neutral point receiving grooves receives two among the start end, the terminating end, and the plurality of via ends of the coil.

7. The motor of claim 1, wherein the stator assembly further comprises an insulator coupled to a top of the stator core, wherein the insulator comprises a storage portion that accommodates at least one of the plurality of power terminals or the neutral point terminal.

8. The motor of claim 7, wherein the storage portion comprises:
a first storage portion that accommodates at least a part of the neutral point terminal, the first storage portion defining a plurality of coil insertion grooves; and
a second storage portion that accommodates at least a part of the plurality of power terminals.

9. The motor of claim 8, wherein the neutral point terminal defines a plurality of neutral point receiving grooves that accommodate the coil, and wherein the plurality of coil insertion grooves are connected to the plurality of neutral point receiving grooves.

10. The motor of claim 9, wherein the plurality of coil insertion grooves are two coil insertion grooves defined in the first storage portion.

11. The motor of claim 1, wherein the plurality of tooth portions comprise a first tooth portion corresponding to the first phase current, a second tooth portion corresponding to the second phase current, and a third tooth portion corresponding to the third phase, wherein the plurality of power terminals comprise a first power terminal configured to communicate the first phase current, a second power terminal configured to communicate the second phase current, and a third power terminal configured to communicate the third phase current, and wherein the primary winding and the secondary winding comprise:
a first phase primary winding and a first phase secondary winding that are wound around the first tooth portion and connected to the first power terminal,
a second phase primary winding and a second phase secondary winding that are wound around the second tooth portion and connected to the second power terminal, and
a third phase primary winding and a third phase secondary winding that are wound around the third tooth portion and connected to the third power terminal.

12. The motor of claim 11, wherein the neutral point terminal defines a neutral point receiving groove, wherein the coil extends from a start end of the coil in the neutral point receiving groove to the first phase primary winding, passes the first power terminal, and then continues to the first phase secondary winding, the first phase secondary winding having the first phase via end that passes through the neutral point receiving groove and that is connected to the second phase primary winding, wherein the coil extends from the first phase via end in the neutral point receiving groove to the second phase primary winding, passes the second power terminal, and then continues to the second phase secondary winding, the second phase secondary winding having the second phase via end that passes through the neutral point receiving groove and that is connected to the third phase primary winding, and wherein the coil extends from the second phase via end in the neutral point receiving groove to the third phase primary winding, passes the third power terminal, and then continues to the third phase secondary winding, the third phase secondary winding having a terminating end of the coil that passes through the neutral point receiving groove.

13. The motor of claim 4, wherein the neutral point terminal comprises:
a first plate; and
a second plate that is bent from the first plate and extends to face the first plate, and wherein the first plate and the second plate define the plurality of neutral point receiving grooves that are connected to each other.

14. The motor of claim 13, wherein the plurality of via ends are portions of the coil that connect one of the plurality of tooth portions to another of the plurality of tooth portions, and wherein the plurality of neutral point receiving grooves comprise:
a first groove that accommodates the start end and the terminating end of the coil; and
a second groove that accommodates the plurality of via ends of the coil.

15. The motor of claim 14, wherein each of the first groove and the second groove extends vertically from a bending portion disposed at bottom ends of the first plate and the second plate, and wherein the start end is disposed vertically above the terminating end of the coil in the first groove.

16. The motor of claim 1, further comprising:
a housing frame that supports a first end of the rotation shaft;
a housing cover that is connected to the housing frame and supports a second end of the rotation shaft;
a diffuser disposed in the housing cover;
an impeller disposed on the diffuser and connected to the rotation shaft, the impeller being configured to rotate together with the rotation shaft; and
an inverter disposed on the housing frame, the inverter being positioned at an opposite side of the impeller with respect to the housing cover, the inverter comprising heat generating elements that face the impeller, wherein at least a part of the stator assembly is accommodated between the housing frame and the housing cover, and wherein the neutral point terminal and the plurality of power terminals protrude from the stator assembly toward the inverter and are disposed between the heat generating elements of the inverter.

17. The motor of claim 16, wherein the housing frame comprises:
- a first bearing receiving portion disposed at a center of the housing frame;
- a plurality of connection bridges that extend radially from the first bearing receiving portion; and
- a leg body that extends from an end of each of the plurality of connection bridges toward the housing cover, each leg body having a first end coupled to the housing cover and a second end coupled to the inverter.

18. The motor of claim 16, wherein the inverter comprises a circuit board,
- wherein at least a part of the circuit board is disposed in a discharge path of air discharged by the impeller, and
- wherein the heat generating elements of the inverter are positioned closer to an outer edge of the circuit board than to a center of the circuit board.

19. The motor of claim 18, wherein the heat generating elements of the inverter comprise transistors and capacitors.

20. A home appliance comprising the motor according to claim 1.

* * * * *